Jan. 11, 1938. G. T. BALDWIN 2,104,720
MEANS FOR USE IN FEEDING SHEETS TO PRINTING AND OTHER LIKE MACHINES
Filed Feb. 27, 1936 7 Sheets-Sheet 1

INVENTOR
George T. Baldwin
BY
ATTORNEY

Jan. 11, 1938.　　　　G. T. BALDWIN　　　　2,104,720
MEANS FOR USE IN FEEDING SHEETS TO PRINTING AND OTHER LIKE MACHINES
Filed Feb. 27, 1936　　　7 Sheets-Sheet 2

INVENTOR
George T. Baldwin
BY
ATTORNEY

Jan. 11, 1938. G. T. BALDWIN 2,104,720
MEANS FOR USE IN FEEDING SHEETS TO PRINTING AND OTHER LIKE MACHINES
Filed Feb. 27, 1936 7 Sheets-Sheet 3
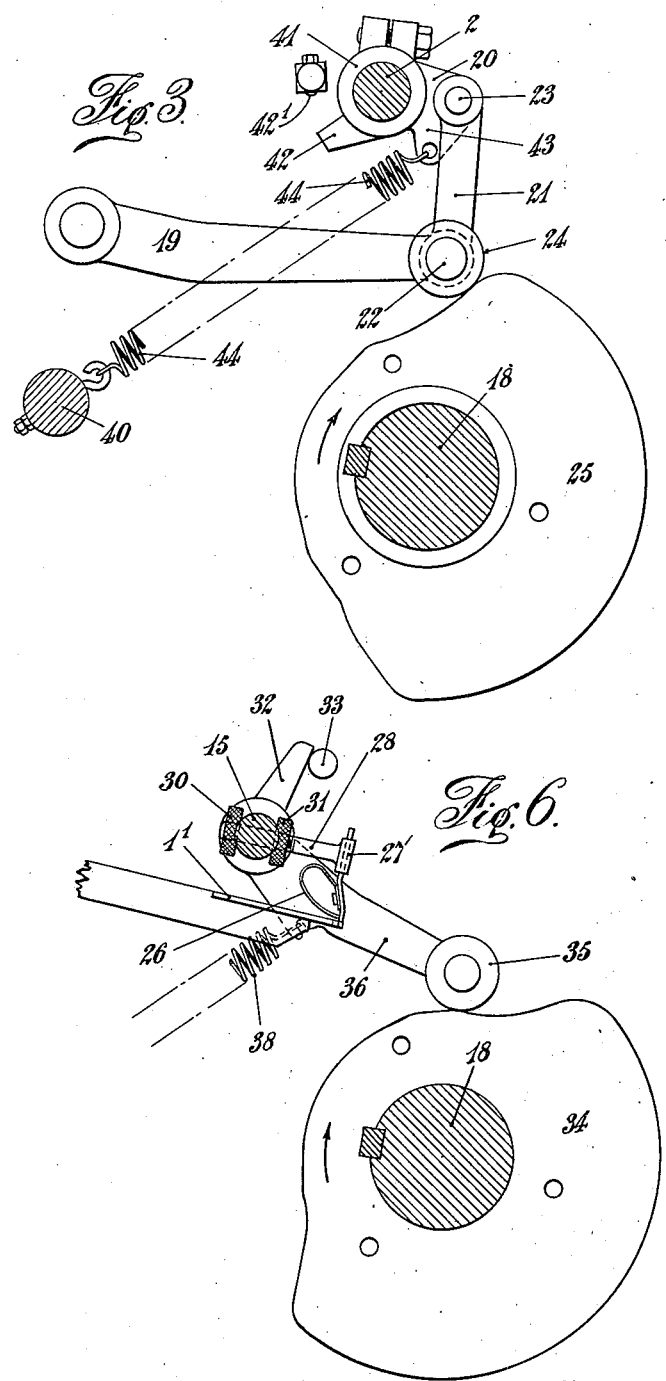

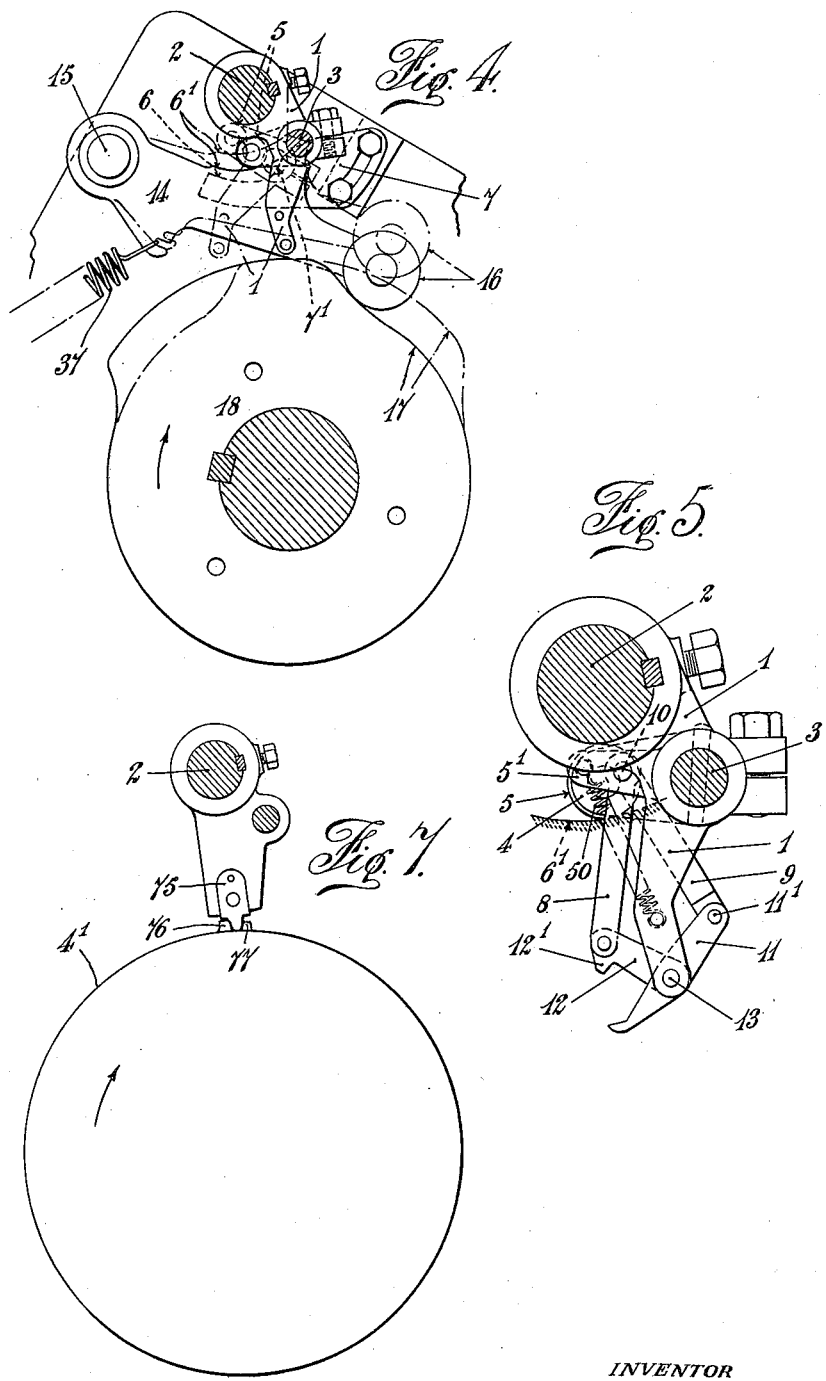

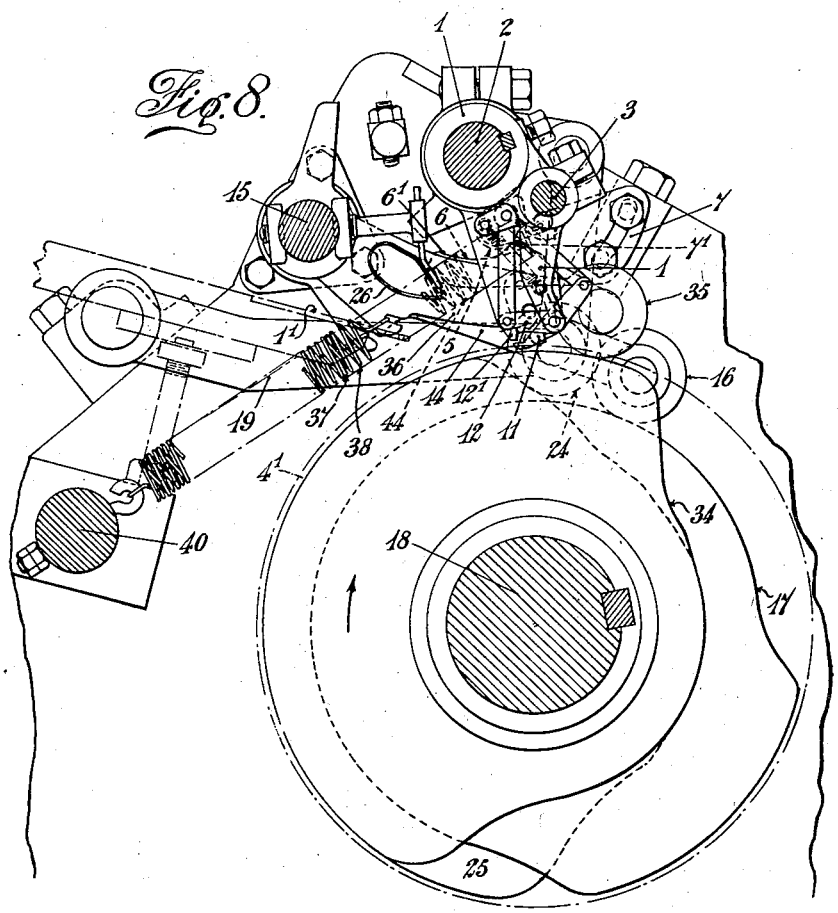

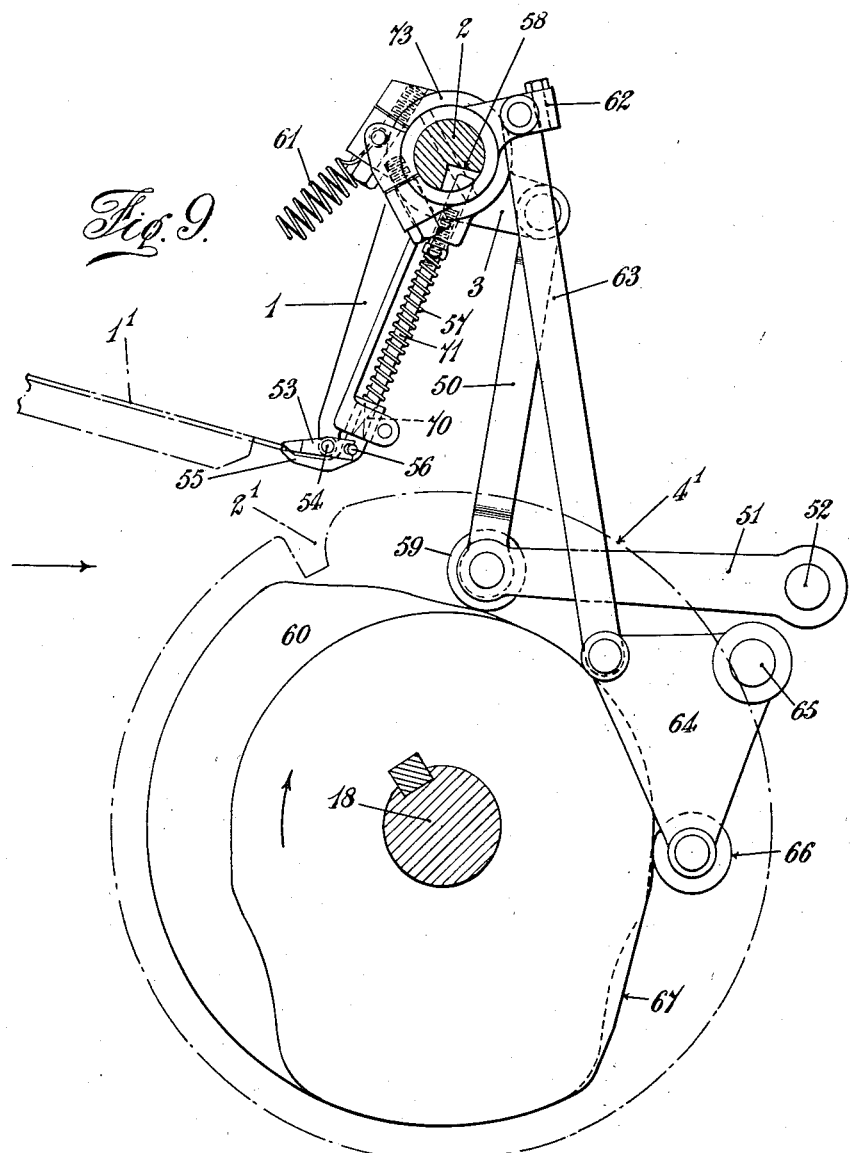

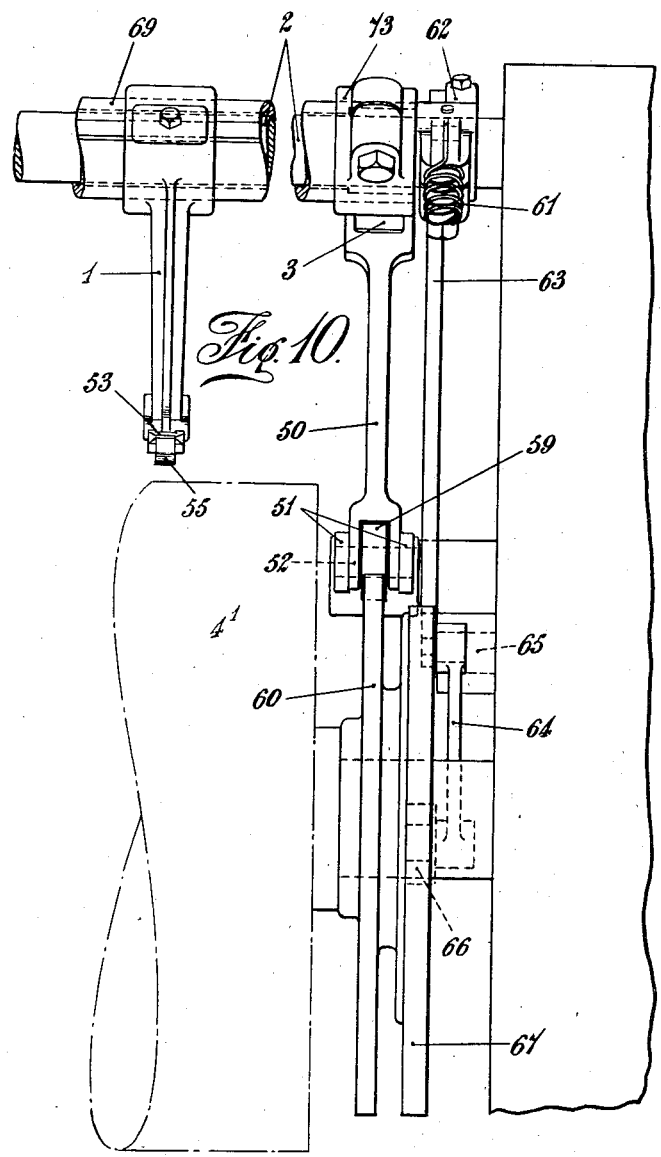

Patented Jan. 11, 1938

2,104,720

UNITED STATES PATENT OFFICE 2,104,720

MEANS FOR USE IN FEEDING SHEETS TO PRINTING AND OTHER LIKE MACHINES

George Thomas Baldwin, London, England

Application February 27, 1936, Serial No. 66,128
In Great Britain June 4, 1935

17 Claims. (Cl. 271—53)

This invention relates to printing and like machines and more particularly to rotary and like machines of the type which are provided with oscillatory gripper mechanism comprising pairs of gripping fingers disposed at suitable distances across the width of the machine, the oscillatory or swinging gripper mechanism in accordance with the present invention being for use in feeding sheets of paper, cardboard, sheet metal, Celluloid, tissue paper and other material in sheet form to a rotary printing and like machine and the said invention has for its object to provide an improved construction of oscillating or swinging gripper mechanism which is intended to overcome the disadvantages inherent in gripper mechanism wherein only one gripping finger is moved to the open position of the gripping fingers.

According to the present invention a printing machine preferably of the rotary type is provided with oscillating or swinging gripper mechanism wherein a plurality of pairs of gripping fingers are provided the gripping fingers of each pair being operable simultaneously to open and close the said fingers. One member of each pair of gripping fingers is pivotally fulcrumed intermediately of its ends and the two gripping fingers of each pair being operable simultaneously to effect opening and closing of the gripping fingers. Each gripper comprises a pair of gripping fingers pivotally mounted on a fulcrum common to both fingers which are coupled by a triangular arrangement of links to a pivot pin common to the said links and adapted to be swung to and fro in order to effect opening and closing of the gripping fingers. The triangular arrangement of links is adapted to be extended and reduced laterally in order to effect opening and closing of the gripping fingers. It should be clearly understood that the gripping fingers according to the present invention open and close simultaneously instead of only one gripping finger being operated to open and close the gripping fingers or successively as heretofore. The opening and closing of the gripping fingers is effected by cams which may be disposed in any suitable position relatively to the shaft on which the aforesaid oscillating or swinging arm is mounted. If desired the opening of the gripper fingers may be effected by a cam or cams and the closing movement by a spring or springs. In one convenient form of the invention the aforesaid oscillating or swinging arm of which there may be any desired number across the width of the printing machine carries a shaft on which are mounted a plurality of arms projecting in a direction opposite to that of the direction of rotation of an impression or blanket cylinder of the printing machine with which the gripper carrying arms are associated. Each projecting arm hereinafter referred to as the gripper fingers operating arm carries at its outer end a roller which during the oscillation or swinging of the gripper carrying arm moves along a curved cam path provided on an adjustable and stationary cam. The latter cam is hereinafter referred to as the gripper opening cam. Each gripper arm carries a further arm to which are secured a pair of links mounted on a pivot common to both links and interconnected together and to the oscillating or swinging gripper arm by two gripping fingers one of which is pivotally fulcrumed intermediately of its ends in the oscillating or swinging gripper arm the other gripper finger which is the shorter of the two gripper fingers being also pivotally fulcrumed and mounted on the same fulcrum pin as the longer gripper finger. In the path of the oscillating or swinging gripper arm is a cam lever pivoted at one end in a stationary part of the machine and carrying a roller at its other end the said roller being in contact with a cam of suitable form mounted on the impression or blanket cylinder shaft. The cam lever aforesaid is provided on its upper surface with a cam track which co-operates with the roller carried by the gripper fingers operating arm which is supported by the gripper oscillating or swinging arm and movable therewith and independently thereof.

In a modified form of gripper mechanism also in accordance with the present invention the gripping action of the gripping fingers is effected by a sliding movement imparted to one gripning finger and a pivotal movement imparted to the other finger as the result of the said sliding movement. In such arrangement the slidable gripping finger is actuated against the action of a spring by a cam provided as a recess in a shaft on which the gripper arm is mounted. The latter is mounted on a sleeve which surrounds the gripper arm shaft the said gripper arm and its sleeve being rockable independently of the shaft to effect swinging movement of the gripper arm and consequently the gripping fingers. The gripping finger which is pivotally supported by the gripper arm is loosely and pivotally associated with the slidable gripping finger.

In order that the invention may be clearly understood and readily carried into effect reference is made to the accompanying drawings which show diagrammatically and by way of example gripper mechanism for use in feeding sheets to rotary printing and other like machines.

Figure 3 drawn to a reduced scale is an elevation showing the cam used to swing the gripper arms.

Figure 4 drawn to a reduced scale is an elevation showing the cam and associated cam used to raise the gripping fingers into the open position and to maintain them in that position during the return stroke or swing of the gripping fingers to the feed table, the gripping fingers being omitted for convenience.

Figure 5 drawn to a reduced scale is an elevation of the gripping fingers held in the open position by a movable cam.

Figure 6 drawn to a reduced scale is an elevation of mechanism for use in operating a front lay.

Figure 7 drawn to a reduced scale is an elevation of the means used to maintain synchronism or register between the machine cylinder and the swinging gripper arms.

Figure 1:
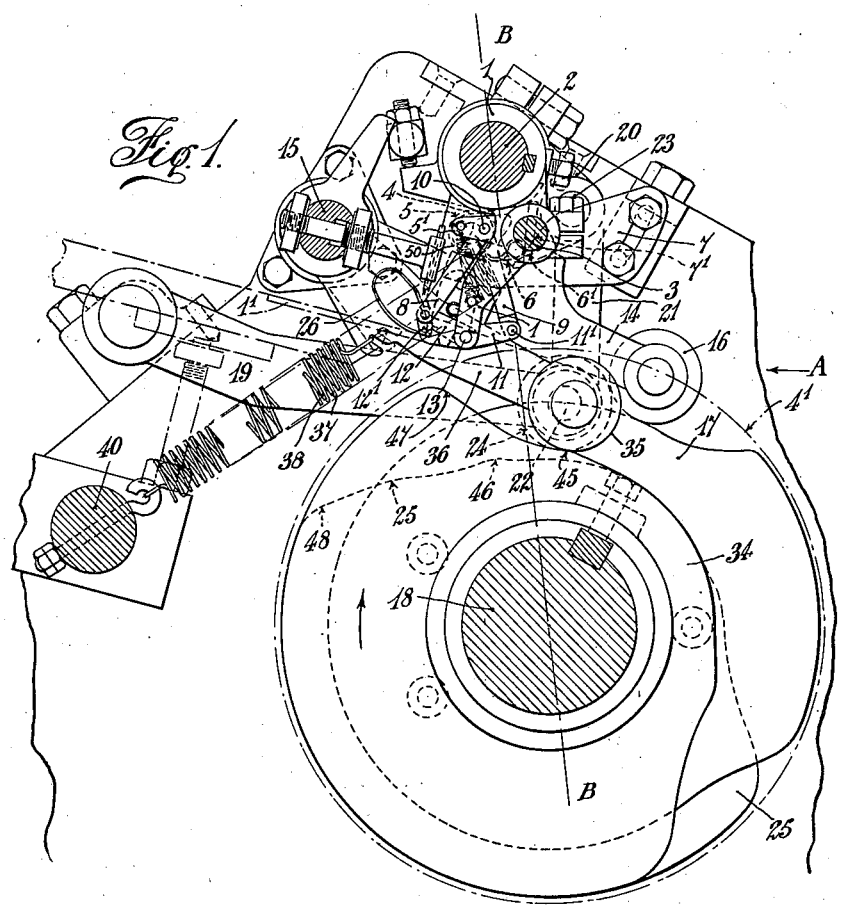
Figure 1 is an end elevation of gripper mechanism and an associated impression or blanket cylinder in accordance with the present invention the cylinder being shown in dot and dash lines and the gripping fingers being shown in a position to remove a sheet from a feed table.
Figure 2:
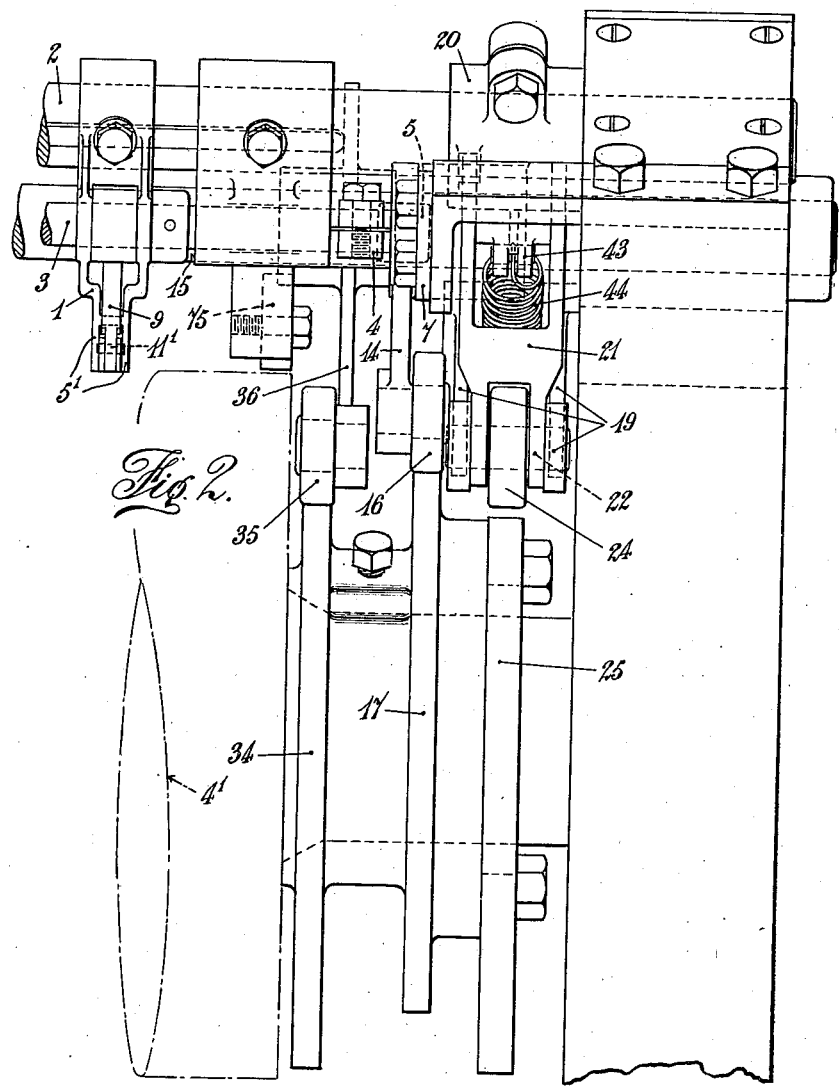
Figure 2 is an elevation looking in the direction of the arrow A Figure 1.

Figure 8 drawn to the same scale as Figure 1, is an end elevation showing the gripping fingers just starting to open and in the position in which the cylinder grippers have already gripped the paper.

Figure 9 is an elevation of a preferred form of gripping mechanism in accordance with the present invention.

Figure 10 is a side elevation of Figure 9 looking in the direction of the arrow, Figure 9.

The line B—B in Figure 1 indicates the position of the gripping fingers when they begin to open.

Referring to the drawings 1 is an oscillating or swinging arm of which there may be any desired number across the width of the printing machine the said arms being mounted on a shaft 2. The arms 1 carry a shaft 3 on which is mounted an arm 4 (Figures 1, 5 and 8) projecting in a direction opposite to that of the direction of rotation of an impression or blanket cylinder 4' (shown in dot and dash lines) of the printing machine with which the gripper carrying arms 1 are associated. The projecting arm 4 hereinafter referred to as the gripper opening and closing arm carries at its outer end a roller 5 which during the rocking or swinging of the gripper carrying arms 1 moves along a curved cam path 6 provided as a support on an adjustable and stationary cam lever 7. The latter cam is hereinafter referred to as the gripper opening cam. Mounted on the shaft 3 carried by the arms 1 are a plurality of forked arms 5' and between the forks of each arm 5' are secured a pair of links 8, 9, Figures 1, 5 and 8 mounted on a pivot 10 common to both links 8, 9 and interconnected together and to the rockable gripper arm 1 by two gripping fingers 11—12 one 11 of which is pivotally fulcrumed as at 13 intermediately of its ends in the rockable gripper carrying arm 1 the other gripper finger 12 which is the shorter of the two gripper fingers being also pivotally fulcrumed and mounted on the same fulcrum pin 13 as the longer gripper finger 11. The gripper finger 12 is provided with a downwardly projecting nose 12' Figures 1, 5 and 8. The gripper finger 11 is pivotally connected to the link 9 as at 11'. In the path of the rockable gripper arm 1 is a cam lever 14, Figures 1, 2, 4 and 8 pivoted at one end as at 15 in a stationary part of the machine and carrying a roller 16 at its other end the said roller 16 being in contact with a cam 17 of suitable form mounted on the impression or blanket cylinder shaft 18. The cam lever 14 is provided on its upper surface with the cam track 6' which partly coincides with the cam track 6 on the lever 7 and co-operates with the roller 5 carried by the gripper fingers opening and closing arm 4 which is supported on the shaft 3 carried by the rockable or swinging gripper arm 1 and movable therewith and independently thereof. When the gripper fingers 11, 12 close on a sheet of material such closure being effected simultaneously by both fingers 11, 12 the rockable or swinging arm 1 carries the grippers and sheets into a position to permit of the sheet being gripped by the main grippers (not shown) associated with the impression or blanket cylinder 4'. The gripper fingers 11, 12 are caused to open by the movement of the roller 5 on the opening arm 4 along the cam track 6 formed by the stationary and adjustable opening cam and they remain open during the major portion of the forward movement of the oscillating or swinging arm 1 and they are caused to close by the form of the closing cam operated by the cam mounted on the impression or blanket cylinder shaft.

The rockable or swinging movement of the gripper arms 1 together with the arms 4 and 5' is effected by the levers 19, 20 and link 21 pivotally connected to the levers 19 and 20 as at 22 and 23 respectively. On the pivot 22 is mounted a roller 24 which co-operates with a cam 25 to effect swinging or rocking movement of the gripper fingers 11, 12. A front lay is indicated at 26 Figures 1, 6 and 8. The lay 26 is mounted in a bar 27 Figure 6 carried by a pin or pins 28 passing through the rod 15 and adjustable therein by nuts 30, 31. 32, 33 are stops which limit the down position of the lay 26. The lift of the lay is caused by a cam 34 which acts on a roller 35 carried by a lever 36. The latter is mounted on and movable with the rod 15. The movable cam lever 14 and the lay operating lever 36 are connected by springs 37 and 38 to a rod or pin 40 common to both springs. On the rod or shaft 3 is mounted a boss 41 provided with a stop 42 and a lug 43 to which a spring 44 is connected. The stop 42 co-operates with an adjustable stop 42' to limit the movement of the lever arm 20 and boss 41 therewith. The other end of the spring 44 is connected to the rod 40, Figures 1 and 3.

The operation of the aforesaid mechanism is as follows: the cylinder 4' being assumed to rotate in the direction of the arrow Figure 1. In the positions of the parts shown in Figure 1 the gripping fingers have closed on a sheet and the roller 35 has just reached the initial operative position 45 of the lay operating cam 34, Figure 1. Meantime it will be observed that the starting operative position 46 of the cam 25 has not yet reached the roller 24 to cause swinging of the gripper arms. It will also be observed that the roller 16 is on an idle or rest part of the cam 17. As the cams 17, 25 and 34 rotate the roller 35 is raised and continues to rise thus lifting the lay 26 until the point 47 on the cam 34 comes into contact with the roller 35. Meantime the gripper arms 1 first of all remain stationary until the point 46 on the cam 25 comes into contact with the roller 24.

The gripper arms 1 then begin their forward movement that is to the right hand side of Figure 1. As the gripper arms 1 swing toward the right the roller 5 rolls on the cam tracks 6, 6', without causing the grippers to open both cam tracks being coincident at this moment. As will be seen from Figures 1 and 4 the stationary adjustable cam 7 has an upwardly extending cam portion 7' inclined to the right in Figures 1 and 4. When the roller 5 reaches the root of the cam portion 7' the arms 4 and 5' start to rise and continue to do so until the point 48 on the cam 25 comes under the roller 24. Between the points 46 and 48 on the cam 25 and while the latter is acting on the roller 24 the following sequential operations have been effected on the gripping fingers. First of all the gripping fingers carrying a sheet accelerate to cylinder speed. Secondly the gripping fingers thereafter move at constant speed and at the same speed as the cylinder to allow of the transfer of a sheet from the gripping fingers to the cylinder grippers while both sets of grippers are moving at the same constant speed. Thirdly the gripping arms 1 then accelerate to clear the cylinder grippers the gripping fingers 11, 12 being opened at the position indicated by the line B—B, Figure 1, by the action of the cam surface 7' on the roller 5. Fourthly the gripping fingers still in the open position now move to the forward end of their stroke. At the forward end of the stroke the gripping fingers are still in the open position being held in that position by the roller 5 on the cam surface 7' or on the combined surfaces 6' and 7'. As the gripper arms 1 start their return movement toward the feed table 1' the cam 17 comes into operation and acting on the roller 16 raises the movable cam track 6' on the rockable lever arm 14 into a position such that the gripping fingers 11, 12 are maintained in the open position until just before the end of the return stroke. It will be obvious therefore that the cam track 6' replaces the cam track 6 on the stationary cam lever 7 during the return movement of the roller 5 and gripper arms 1 to the feed table 1'. The track 6 which is a supporting track is concentrically arranged relatively to the axis of the shaft 2. Meantime the front lay 26 has returned to the down position. The roller 5 is maintained against the cam tracks 6, 6' and 7' by one or more than one spring 50. The cycle of operations is now repeated as long as desired. As shown on the drawings Figure 1 the roller 5 is raised by the swinging movements of the gripper arms 1 and the cam 7'. If desired however the roller 5 may be raised by the swinging movements of the gripper arms 1 and the combined action of the cam surfaces 6' and 7' by suitable formation and/or adjustment of the cam 17. Further the lift of the roller 5 may be effected solely by the cam surface 6' on the movable cam lever 14 by suitable formation and/or adjustment of the cam 17 in which latter arrangement the stationary cam 7 having the cam surface 7' may be omitted. In each arrangement however the cam surface 6' on the movable cam lever 14 remains in the "up" position in order to retain the gripping fingers in the open position during the return stroke of the gripper arms. It will be readily understood from the foregoing that the closing movement of the gripping fingers 11, 12 tends to increase the value of the apicial angle between the two links 8, 9 carrying the gripper fingers 11, 12. Conversely when the gripping fingers are operated to close on a sheet of material the value of the apicial angle between the two links carrying the gripper fingers is decreased.

In a preferred form of the invention shown in Figures 9 and 10 the aforesaid rockable gripper arm is shown at 1 and is mounted as before on a shaft 2. On the latter there is mounted an arm 3 projecting in a direction opposite to that of the direction of rotation of the impression or blanket cylinder 4' of the printing machine with which the gripper carrying arms 1 are associated. As before 1' is the feed table and 2' is the usual gap in the cylinder shown in dot and dash lines. Each projecting arm 3 hereinafter referred to as the gripper rocking arm is connected at its outer end by a link 50 to a lever arm 51 pivoted as at 52 to a stationary part of the machine. On each rockable gripper arm 1 is a gripper finger 53 pivotally mounted as at 54. Each arm 1 also carries a gripper finger 55 slidably mounted thereon and pivotally connected in a loose manner as at 56 to the gripper finger 53. The gripper finger 55 is slidable against the action of a spring 57 which tends to maintain the upper or free end of the gripper finger 55 against a cam 58 in the form of a recess in the shaft 2. The lever 51 carries at its free end a roller 59 constantly held against an edge cam 60 by a spring 61. The cam 60 is mounted on the cylinder shaft and acts to swing the gripper arms 1 on the shaft 2. On the shaft 2 is a boss carrying a lever arm 62 which is connected by a link 63 to the free end of a lever arm 64 pivoted as at 65 to a stationary part of the machine. The arm 64 at its free end carries a roller 66 which is constantly held against an edge cam 67 by the spring 61. The cam 67 is mounted on the cylinder shaft. The arm 3 of which there may be any desired number across the width of the machine is mounted on a sleeve 69 which surrounds the shaft 2 the cam recess 58 being of triangular form cut out of the shaft 2. The triangular recess or recesses 58 may form a triangular recess cam extending the length of the shaft 2 or only where the rockable arms 1 and 3 are disposed. The gripper arm 1 is provided with a bearing 70 through which passes a rod 71 carrying the gripping finger 55 and slidable against the action of the spring 57. The sliding movement of the rod 71 is transmitted thereto by the upper face of the aforesaid triangular cam recess 58 during the oscillating or swinging movement of the shaft 2 on which the sleeve 69 and the arms 1 and 3 are mounted. The aforesaid slidable rod 71 is formed or provided with the gripper finger 55 at its lower end and the said rod may be of integral form throughout its length or its upper end may be removable and replaceable to allow for adjustment in the length of the rod. The nongripping end of the finger 53 is pivotally supported by the slidable rod 71 as at 56 the said gripping finger 53 being also pivotally fulcrumed as at 54 in the gripper carrying arm 1 and adjacent to the lower end thereof. In both forms of the present invention the rockable gripper carrying arm 1, the shaft 2 on which they are mounted and/or the sleeve 69 thereon as well as the arms 3 may all be movable simultaneously and/or independently of each other. The sleeve 69 is loose on the shaft 2 and carries a boss 73 which is clamped to the sleeve in order that the link 50, arm 3, boss 73 and sleeve 69 may move and act as one unit. The boss 62 is directly clamped to the shaft 2 and therefore the latter and the boss 62 participate in the movement of the link 63.

The operation of the arrangement shown in Figures 9 and 10 is as follows: Assuming that the machine is in operation and that the gripping fingers 53, 55 have gripped a sheet then as the cylinder shaft rotates the gripper arms 1 are swung to the right of Figure 9 that is to say forwardly by the action of the cam 60. The shaft 2 meanwhile remains stationary. As the arm 3 moves upwardly the upper end of the rod 71 abuts against the cam recess 58 thus opening the gripping fingers simultaneously. The latter continue to the ends of the forward stroke. The shaft 2 is then rotated clockwise and the gripper arms commence the return stroke while the grippers remain open. Meantime the sheet has been transferred from the grippers 53, 55 to the main grippers (not shown) when the latter and the gripper fingers 53, 55 are in the proper position to effect this transfer. The gripping fingers 53, 55 remain open until the end of the forward stroke and until the end of the return stroke. The forward stroke of the grippers is effected by the action of the cam 60 on the roller 59 and the link 50 connected to the arm 3. The movement of the shaft 2 is effected by the cam 67 acting on the roller 66 against the action of the spring 61 which latter causes the return movement of the shaft 2.

One or more than one gripper arm is provided with a metal insert 75 having a tooth 76 which in order to synchronize the swinging movements of the gripper arms 1 with the cylinder revolutions is adapted to engage between a tooth 76 and a shorter tooth 77 on the cylinder 4' and thus insure correct register of the swinging grippers with the cylinder revolutions. The insert 75 is rigid with its gripper arm and moves therewith.

What I claim is:—

1. Gripper mechanism for rotary sheet fed printing machines wherein the gripper mechanism comprises a plurality of pairs of gripping fingers each pair of which is suspended from a triangular arrangement of links adapted to be extended and reduced laterally in order to effect opening and closing of the gripping fingers, a rockable gripper arm, both gripping fingers of a pair being supported on said gripper arm and movable independently thereof, and a cam mounted on a shaft of the machine cylinder for swinging said gripper arm.

2. Gripper mechanism according to claim 1, wherein the gripper arm carries an arm angularly displaceable relatively to the gripper arm and adapted by such relative movement to open and close the gripping fingers.

3. Gripper mechanism according to claim 1, wherein the gripper arm carries an arm movable independently thereof and adapted to actuate the gripping fingers and to be supported on a track concentrically arranged relatively to the centre of the shaft carrying the gripper arm during the forward stroke of the gripper arm and gripping fingers.

4. Gripper mechanism according to claim 1, wherein there is provided an actuating arm for the gripping fingers adapted to be moved into a position to open the gripping fingers by a cam during the forward stroke of the gripper arm the said arm being retained in this position by a cam track displaceable into a position to support the said actuating arm in the open position of the gripping fingers and during the return stroke of the gripper arm.

5. Gripper mechanism according to claim 1, wherein the gripping fingers are associated with an actuating arm adapted to be raised into a position to open the gripping fingers during the forward stroke thereof by a cam on a cam lever which is angularly displaceable into a position to raise the said arm and to retain the latter in the raised position and the gripping fingers in the open position during the return stroke of the gripping fingers.

6. Gripper mechanism for rotary feed printing machines, including a plurality of pairs of gripping fingers, the gripping fingers of each pair being operable simultaneously to open and close the gripping fingers being opened during their forward stroke by the combined action of a stationary cam and a stationary cam and a movable cam which latter also acts to retain the gripping fingers in the open position during their return stroke.

7. Gripper mechanism according to claim 1, wherein the gripping fingers are associated with two lever arms both carried by the gripper arm and movable together and independently of the gripper arm one lever arm forming an actuating lever to open and close the gripper fingers and the other lever arm supporting the gripping fingers at the operating ends thereof.

8. Gripper mechanism according to claim 1, wherein there is provided an actuating arm for the gripping fingers supported during the forward stroke of the gripper arm by a stationary lever having a track concentric with the axis of the shaft of the gripper arm the said support being replaced by a cam track on a pivoted lever displaceable into position to support the said arm and retain the gripping fingers in the open position.

9. Gripper mechanism according to claim 1, wherein the gripping action of the gripping fingers is effected by a sliding movement imparted to one gripping finger and a pivotal movement imparted to the other finger as result of the said sliding movement.

10. Gripper mechanism for rotary sheet fed printing machines comprising in combination a plurality of pairs of gripping fingers spaced apart at intervals across the width of the machine means to open and close the gripping fingers simultaneously and means to reciprocate the gripping fingers in an arcuate path.

11. Gripper mechanism for rotary sheet fed printing machines comprising in combination a plurality of gripper arms spaced across the machine, a plurality of pairs of gripping fingers carried by the said gripper arms, means mounted on the grippers and adapted to be moved independently thereof to operate simultaneously both gripping fingers of each pair of gripping fingers and means to reciprocate the gripper arms and gripping fingers in an arcuate path.

12. Gripper mechanism for rotary sheet fed printing machines comprising in combination a plurality of gripper arms spaced apart across the machine, arms projecting therefrom and movable independently thereof, gripping fingers suspended from the said projecting arms, means to actuate the projecting arms to open and close the gripping fingers simultaneously and means to reciprocate the gripper arms and gripping fingers carried thereon in a curved path.

13. In oscillatory gripper mechanism for rotary sheet fed printing machines, a plurality of pairs of oscillatory gripper fingers disposed at suitable distances apart and across the width of the machine, means mounted on and rotatable with the shaft of an impression or blanket cylinder disposed below the gripping fingers to oscillate the gripping fingers, and means interconnecting the gripping fingers of each pair in such manner that operation of one gripping finger of a pair actuates the other gripping finger of the same pair.

14. Oscillatory gripper mechanism for rotary sheet fed printing machines, comprising a shaft disposed across the machine, an impression or blanket cylinder disposed below the said shaft, means concentrically arranged with the impression cylinder shaft to rock the shaft disposed thereabove, a plurality of pairs of gripping fingers carried by the rockable shaft, and pivotal means interconnecting the gripping fingers of each pair intermediately of their ends.

15. Oscillatory gripper mechanism for rotary sheet fed printing machines, comprising an impression or blanket cylinder, a rock shaft superposed thereabove, pairs of gripping fingers carried by the said rock shaft, means concentrically arranged with the impression cylinder shaft to oscillate the gripping fingers, pivotal means interconnecting and common to both gripping fingers of a pair, a triangular arrangement of links supporting the gripping fingers, and means to suspend the links from a pivot common to at least two of the said links.

16. Oscillatory gripper mechanism for rotary sheet fed printing machines, comprising an impression cylinder and its shaft, a shaft superposed thereabove, means concentrically arranged with the impression cylinder shaft and rotatable therewith to rock the superposed shaft, a lever arm mounted on and rockable with the rockable shaft, means to support a pair of gripping fingers, and means to rock the gripping fingers supporting means independently of the movement of the superposed rockable shaft.

17. Oscillatory gripper mechanism for rotary sheet fed printing machines, comprising an impression cylinder and its shaft, a rock shaft superposed thereabove, means concentric with the impression cylinder shaft to rock the superposed pairs of gripping fingers, triangularly arranged links adapted to support the pairs of gripping fingers, and means to extend and reduce the triangularly arranged links to open and close the gripping fingers.

GEORGE THOMAS BALDWIN.